Aug. 22, 1967 J. M. PUPPOLO ET AL 3,337,679

ELECTRIC COMPONENT ENDSEAL

Filed Feb. 7, 1966

United States Patent Office 3,337,679

Patented Aug. 22, 1967

3,337,679

ELECTRIC COMPONENT ENDSEAL

John M. Puppolo, North Adams, Mass., and James D. Smith, Milford, N.H., assignors to Sprague Electric Company, North Adams, Mass., a corporation of Massachusetts Filed Feb. 7, 1966, Ser. No. 525,561
5 Claims. (Cl. 174—52)

ABSTRACT OF THE DISCLOSURE

An electrical component is provided with an endseal including a tubulation having a passageway with a large internal diameter portion to accommodate a joint of two lead-wires and a small internal diameter portion to pass one of the lead-wires in a solder fit.

Figure 1:
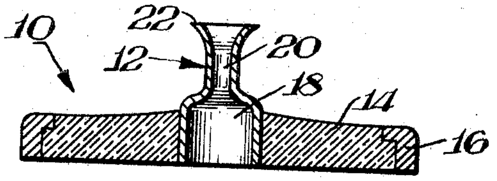

This invention relates to an endseal for electrical components and particularly to a hermetic glass-to-metal seal for capacitors.

Conventional glass-to-metal seals for capacitors and other electrical components employ a glass or ceramic plug which is sealed on its periphery to a container for the component, and which encompasses a metal tubulation through which the component lead extends. The seal of the container is completed by soldering of the lead to the tubulation.

In many devices, such as electrolytic capacitors, it is desirable to provide an external lead having different characteristics than the internal component lead, and to join these near or within the tubulation. This is accomplished in the prior art by providing a tubulation of relatively large diameter, and by minimizing the diameter of the internal-external lead joint. For example, leads are joined in the prior art by a weak butt weld or by a lap weld which is then cold worked by hammering, or the like, to reduce the diameter.

This, however, results in increased cost and lower reliability. For example, the large tubulation diameter not only results in a poor solder joint but also permits solder to run through the eyelet and damage the component. Furthermore, in such cases, it requires excess heating to solder the lead to the tubulation and thus provides an undesirable stress of the seal.

It is an object of this invention to provide an economical endseal of high reliability for electrical components.

It is a further object of this invention to provide a glass-to-metal seal which encloses both external and internal leads and provides a solder fit to the external lead.

It is a still further object of this invention to provide a glass-to-metal seal which is subject to a low thermal stress during soldering of the external lead.

Figure 2:
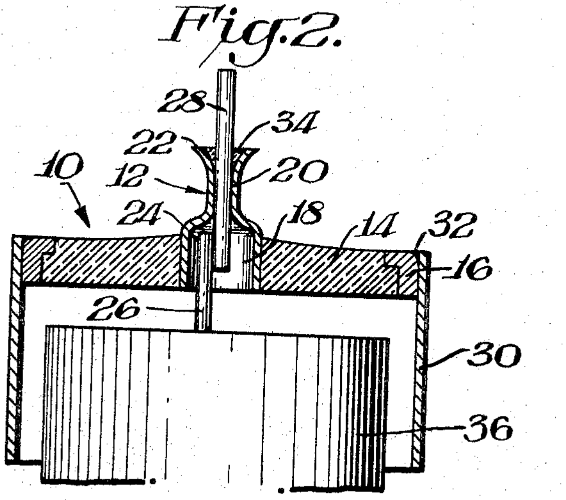

These and other objects of the invention will be more apparent from a consideration of the following description taken in conjunction with the drawing in which:

FIGURE 1 is a view in section of a glass-to-metal seal produced in accordance with the invention; and FIGURE 2 is a view, partly in section, of a solid electrolytic capacitor employing the seal of FIGURE 1.

Basically, an endseal formed in accordance with the invention comprises an insulating plug surrounding and sealed to a tubulation having a passageway therethrough, said passageway having a small and a large diameter portion, said small diameter providing a solder fit for an external lead, and said large diameter accommodating a connection between said external lead and an internal lead of a component.

In a more limited sense, an endseal for electrical components comprises a glass plug, and a two diameter tubulation, said tubulation having a large diameter portion sealed to said plug for enclosing an external and internal component lead in side by side relation, and a small diameter portion extending from said plug providing a solder fit for said external lead.

An electrical capacitor, provided in accordance with the invention, comprises a metal container having a capacitive section therein. At least one end of said container is closed by a glass plug having a two diameter tubulation. A metal lead extends from one element of said capacitive section and is joined within a large diameter portion of the tubulation to an external lead which extends through and is soldered to a small diameter portion of the tubulation.

Referring now to the drawing and to FIGURE 1 in particular wherein is shown an endseal 10 having a two diameter metal tubulation 12, an insulating plug 14 of glass or the like, and an outer metal ring 16. The tubulation 12 has a large inner diameter 18 connecting with a small inner diameter 20. As shown, the large section of tubulation 12 is sealed within the glass plug 14, whereas the small section is extended from plug 14 and has a short flare 22, at the extended end. The tubulation is thus provided with a two diameter passageway having a small diameter 20 and a large diameter 18 portion. Tubulation 12 is constructed, in the preferred embodiment, with a necked down section so that a small and large outer diameter is provided in conformance to the inner diameters.

The type of glass-to-metal seal is similar to conventional compression type glass-to-metal seals in which the coefficient of expansion of individual members increase from the center outward. Thus, for example, tubulation 12 may be formed of an iron-nickel alloy having an expansion coefficient of 60 to 90 x $10^{-7}$ units per unit length per degree, while ring 16 is steel having an expansion coefficient in the range of 110 to 140, and the glass is a lead, or lime, or other suitable glass having expansion coefficient in the range between the two metal members, such as 90 to 110.

Other types of glass-to-metal seals may also be utilized since the intent of the invention is to provide a two diameter passageway through the tubulation, so that the joint of an external and internal lead may be enclosed within the large diameter portion of the passageway while a relatively close fit is provided to the external lead by the small diameter portion.

As shown in FIGURE 2, seal 10 allows a highly reliable lap joint 24, of an internal lead 26 and an external lead 28, to be enclosed within the large diameter portion 18 of tubulation 12 while also providing a close, or solder fit, to lead 28 by means of the small diameter portion 20. In this figure, a capacitor section 36, such as solid tantalum or the like, is shown enclosed within a metal cylinder or container 30. Lead 26 is a valve-metal lead, such as a tantalum oxide filmed wire, affixed to one electrode of section 36 and joined to an external lead 28 of nickel or the like.

Seal 10 is sealed at its perimeter to container 30 and to external lead 28 by solder 32, 34 respectively, or by other suitable means.

The internal-external lead connection 24 is positioned within the large diameter portion 18 of eyelet 12, so as to shield the unfilmed external lead 28 while permitting a reliable side by side joining or lap weld, or other connection which may result in an increased diameter. It further provides a more compact assembly since the plug 14 is adjacent rather than above joint 24.

As indicated, external lead 28 is sealed to eyelet 12 in the necked down portion 20 by solder 34, or the like. The inner diameter in this area provides a solder fit to lead 28. Thus, the inner diameter must provide enough clearance around lead 28 to allow solder to flow into the joint but not so much clearance that the solder, or other brazing material, will not bridge the clearance or will easily flow through the small diameter portion. For most commonly used solders or brazing materials, a clearance of from .001" to .005" on a side is suitable. This clearance provides an excellent bond with a minimum of heat, and prevents a flow of solder into the large diameter portion 18 or the interior of container 30. Thus, plug 14 is exposed to lower thermal stress since less heat is required to seal lead 28 and, since the necked down section, employed in the preferred embodiment, restricts the flow of heat to the glass seal area.

Accordingly, tubulation 12 provides a solder fit for external lead 28 while accommodating a connection between leads 26, 28 in side by side relation. For example, with leads 26, 28 of approximately .020" diameter, a smaller inner diameter 20 of approximately .026" and a large inner diameter 18 of at least .040" is suitable.

Although a necked down tubulation is preferred, the invention may also be practiced with a tubulation having a uniform outer diameter, however, such construction is not as useful as the preferred necked down embodiment since it requires a costly machined tubulation and would conduct additional heat to plug 14.

An outer ring or grommet 16 which facilitates bonding to a container is also shown and described in regard to the preferred embodiment, however, in some applications, where it is desirable to seal the plug 14 directly to container 30, ring 16 can be eliminated.

Furthermore, although a specific embodiment has been described herein it should be understood that many different embodiments may be made without departing from the spirit and scope thereof and that the invention is not to be limited except as defined in the appended claims.

What is claimed is:

1. An electrical capacitor comprising a container having a capacitive section therein, said container having at least one endseal closing at least one end thereof, said endseal comprising a tabulation surrounded by and sealed within an insulating plug, said tubulation having a passageway therethrough, said passageway having a small diameter portion and a large diameter portion therein, said section having at least one internal lead in connection to one element thereof and extending from one end thereof to within said large diameter portion, and an external lead connected to said internal lead within said large diameter portion, said external lead extending through said small diameter portion and sealed thereto, said small diameter portion providing a solder fit for said external lead, and said large diameter portion accommodating said connection between said leads.

2. A capacitor as claimed in claim 1 including a second of said endseals at the other end of said container, a second internal lead in connection to another element of said section, and a second external lead joined to said second internal lead within the large diameter portion of said second seal and extending through the small diameter portion thereof and sealed thereto.

3. A capacitor as claimed in claim 1 wherein said large diameter portion is substantially twice the diameter of said small diameter portion, and wherein said large diameter portion accommodates a side by side connection between said leads.

4. A capacitor as claimed in claim 3 wherein said tubulation has a small and large outer diameter conforming to said small and said large diameter portions respectively, and said small diameter portion is extended from said plug.

5. An electrical component comprising a container having a component device therein, said container having an endseal closing an end thereof, said endseal comprising a tubulation surrounded by and sealed within an insulated plug, said tubulation providing a passageway therethrough having a small diameter portion and a large diameter portion, said component device having an internal lead-wire extending therefrom to within said large diameter portion, said component device having an internal internal lead-wire within said large diameter portion, said external lead-wire extending through said small diameter portion in a solder fit therewith and sealed thereto, and said large diameter portion accommodating said connection between said internal lead-wire and said external lead-wire.

References Cited

UNITED STATES PATENTS

| | | | |
|---|---|---|---|
| 3,100,813 | 8/1963 | Rice | 174—52 |
| 3,248,618 | 4/1966 | Szpak | 317—230 |
| 3,255,387 | 6/1966 | Giacomello | 174—50.55 |

FOREIGN PATENTS

| | | |
|---|---|---|
| 350,719 | 1/1961 | Switzerland. |

LEWIS H. MYERS, *Primary Examiner.*

E. GOLDBERG, *Assistant Examiner.*

UNITED STATES PATENT OFFICE
CERTIFICATE OF CORRECTION

Patent No. 3,337,679 August 22, 1967

John M. Puppolo et al.

It is hereby certified that error appears in the above numbered patent requiring correction and that the said Letters Patent should read as corrected below.

Column 3, line 39, for "tabulation" read -- tubulation --; column 4, line 29, for "said component device having an interna: read -- an external lead-wire connected to said --.

Signed and sealed this 15th day of October 1968.

(SEAL)
Attest:

Edward M. Fletcher, Jr.
Attesting Officer

EDWARD J. BRENNER
Commissioner of Patents